Oct. 18, 1949.　　　　E. ROCCO　　　　2,485,460
CHRISTMAS TREE STAND
Filed March 3, 1947　　　　　　　　　2 Sheets-Sheet 2
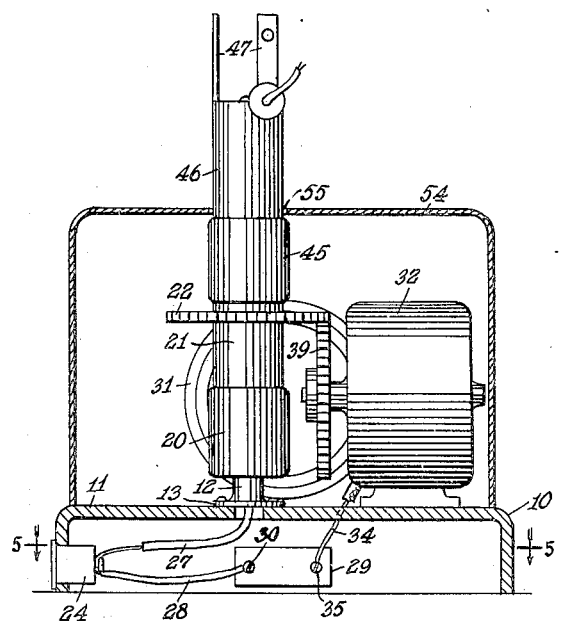
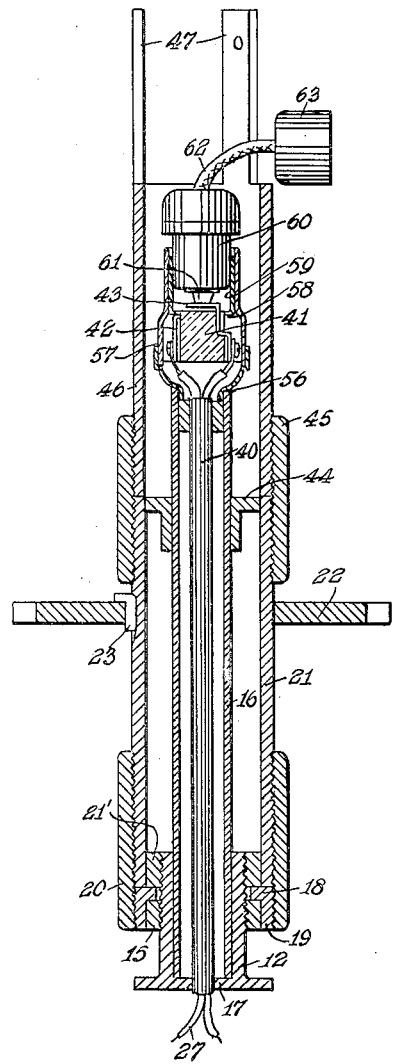
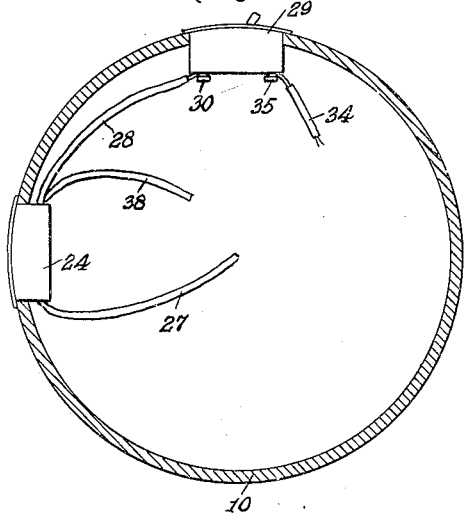
INVENTOR.
Ernest Rocco Patented Oct. 18, 1949

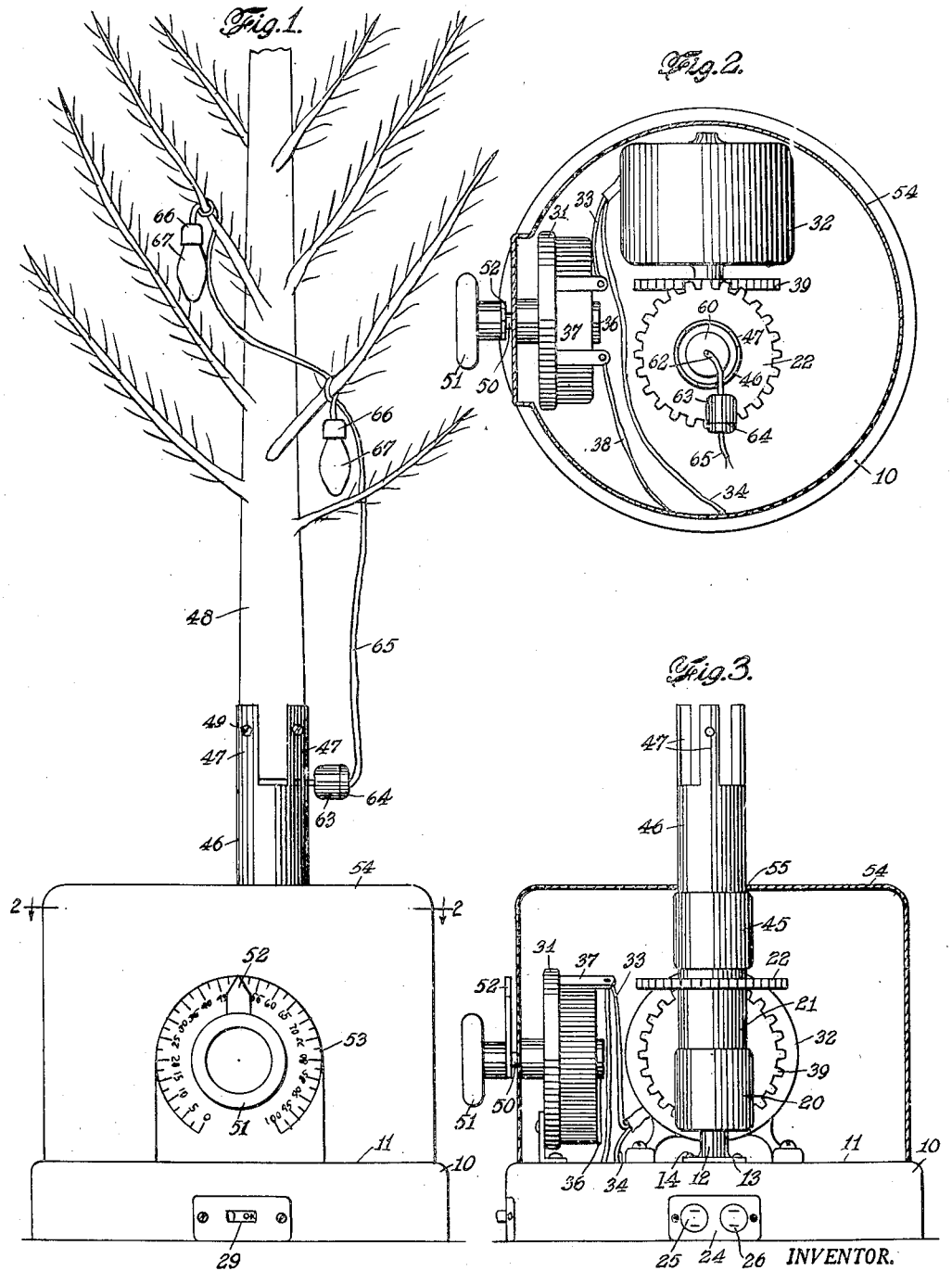

2,485,460

UNITED STATES PATENT OFFICE 2,485,460

CHRISTMAS TREE STAND

Ernesto Rocco, Brooklyn, N. Y.

Application March 3, 1947, Serial No. 732,053

1 Claim. (Cl. 248—45)

The present invention relates to mechanically actuated tree stands, and particularly to a motor equipped stand for supporting and rotating a Christmas tree.

The main object of my invention is to provide a stand of the character mentioned which has a firm stationary base for the stand and the mechanism serving to rotate the tree, as well as a cover for protecting said mechanism.

Another object is to have such a stand provided with means for connecting it to a current source and a switch for controlling the operation of the tree-rotating mechanism at will.

A further object is to provide such a tree stand with two connecting means for introducing electric current to the same in order to supply power to the motor rotating the tree and the same or a different current for lighting the tree.

It is also an object to furnish a tree stand of above mentioned character with means for conducting current to the tree on the stand which allows free rotation of the tree.

It is, of course likewise an object of the invention to produce a stand for supporting and rotating and also lighting a Christmas tree, which is sturdy and durable in construction and certain in operation, as well as reasonable in cost.

Other objects and the advantages of my invention will appear more fully in detail as the specification proceeds, due reference being had to the accompanying drawings forming part hereof and in which, Figure 1 is a front elevation of the Christmas tree stand which may be termed a tree rotor stand and which embodies my invention in a practical form;

Figure 2 is a transverse section taken on line 2—2 in Figure 1;

Figure 3 is a central vertical section of the stand in Figure 2;

Figure 4 is a vertical section at right angles to that in Figure 3;

Figure 5 is a section taken on line 5—5 in Figure 4;

Figure 6 is an enlarged detail section of the rotary support for the tree and the electrical connections involved in the upper portion thereof.

Christmas tree stands are many and various in size and form, and some are severe while others are ornamental, but as a rule, they are all stationary and support the tree in fixed position. It is, of course quite usual to decorate the tree as far as possible, while frequently mechanical devices and electric trains are combined with such trees to enhance the interest of the younger generation in the Christmas tree and the season during which it is used.

However, it is now proposed to support the tree on a special stand which is equipped to rotate the tree and also supply electric current thereto for illumination of the tree during rotation in order to produce very novel and interesting effects.

Hence, referring again to the drawings, in the practice of my invention, I employ a broad base, generally indicated at 10, which is preferably a round drum of metal or other material, the same being shallow and inverted. Upon the flat top 11 of the drum is mounted an upright hollow supporting member 12 having the flange 13 thereof secured to the base by screws or bolts 14, the upper portion of said member being threaded and having a collar 15 screwed tightly upon the thread so as to be fixed in place. Within the mentioned supporting member is fixed a hollow post 16 which rests on the partly closed bottom 17 of member 12 and extends upward a distance to form a central guide for the entire upper portion of the stand.

Upon the collar 15 slidably rests the flange 18 of a short externally threaded nipple 19 which is fitted into the lower end of a coupling or internally threaded sleeve 20. Above the flange 18 is located a limiting collar 21' fitted on the upper end of upright member 12 and allowing the flange to rotate on collar 15 but preventing it from being displaced therefrom. The coupling 20 which is thus supported by flange 18 rotatably on collar 15 has an upwardly extending pipe or tube 21 screwed into the same and upon the mentioned tube is secured a gear 22 fixed by a spline 23 to ensure positive rotation of the tube with said gear.

In the base is secured a double inlet block 24 having the two plug-in inlets 25 and 26 (Figure 3), having the leads 27 and 28, the latter running to a switch 29 at 30 (Figures 4 and 5). Upon the same base above switch 29 is mounted a rheostat 31 and spaced a short distance from the latter is mounted a motor 32 connected to said rheostat by a lead 33, while another lead 34 on the motor is connected through the base to switch 29 at 35, the result being that when electric current is brought to the motor by way of inlet 25, the current is controlled by switch 29. The other end of the rheostat connections through its contact member 36 and corresponding post 37 communicates through the base with inlet 25 through lead 38 to complete the circuit. The motor has a drive gear 39 which meshes with gear 22 on upright tube 21, so that when the switch is thrown on and the motor starts, its gear 39 will cause gear 22 and tube 21 to rotate, these gears meshing substantially like a pair of crown or bevel gears.

To the other lead or cable 27 is connected the inlet 26 said cable running up through a protecting tube 40 into a commutating head 41 where the wires separate and are connected to the upper contact piece 42 and lug 43, said head being fitted into the upper end of stand pipe 16, and the latter having an upper flange 44. The outer pipe 21 has a second sleeve or coupling 45 fixed upon the upper end thereof and into this sleeve is fitted a further pipe 46 which terminates at the top in a group of prongs 47, 47, etc., adapted to receive the lower end of a tree 48 between them, and screws 49 or the like may be inserted through the prongs into the tree to retain it in place. The flange 44 remains stationary during rotation of pipe 21 and guides the latter and holds it upright during rotation.

Returning for the moment to the rheostat 31, the contact member 36 is mounted on shaft 50 having a manually controlled outside knob 51 and a pointer 52 traveling over a scale 53 upon the outside of a cover or casing 54 for the operative mechanism mounted on base 10 and held in place by any means occurring to a person skilled in the art. Since the tree supporting upper pipe 46 extends upward it passes through an aperture 55 in the mentioned cover 54 and together with the rheostat knob form the only projecting portions of the apparatus extending outside the cover.

The upper end of inner pipe 16 is flared at 56 below block 41 and is surmounted by a shell 57 which may be made of plastic or other non-conducting material, and within said shell is a metal shell having a lower edge 58 on 59 making sliding contact with the upper edge of contact strip 42 of block 41 and secured upon the lower portion of plug 60. The latter also has a bottom center contact 61 making contact with contact lug 43; the two members 59 and 61 are connected to the wires within cable 62 at the top which carries terminal plug 63. The cable and both plugs 60 and 63 follow the tree supporting pipe 46 around during its rotation while the inner post or pipe 16 with shell 57 and block 41 remain stationary with its contact pieces 42 and 43, thus allowing rotation of the tree despite the fact that cable 27 and its protecting pipe 40 are stationary.

When the tree 48 is secured in position on the stand between prongs 47, 47, etc., a plug 64 connected to a light cable 65 may be plugged into terminal plug 63 to supply current to the sockets 66, 66, etc., for bulbs 67, 67, etc., in order to light up said bulbs during the rotation of the tree. However, two separate current lines should be plugged into the terminals 25 and 26 in double terminal block 24, the switch 29 and rheostat 31 controlling the current supplied to the motor, while the current supplied to the lighting outfit on the tree is controlled directly by plugging in the live line into terminal 26. While the switch serves to turn the power on or off to the motor, the rheostat serves to pass little or an increased supply of current thereto, for by regulating said rheostat, the motor may be caused to run slowly, moderately fast and very fast, or at a maximum speed permissible for the tree. As the lighting outfit on the latter operates whether the tree is stationary or rotates, it is indifferent whether the current supply is plugged into the lighting terminal before or after the motor has been started. In any event, the tree when illuminated and rotating with its lights and other decorations will make a large striking figure which may not only be nicely controlled as to speed of rotation, but may be kept rotating as long as may be desired.

From the foregoing it is evident that a Christmas tree may be mounted on the apparatus described and both lighted and rotated at controlled speed for as long or short periods of time as a party may desire, while the construction is such that it is possible to use the apparatus from year to year in good working condition.

Manifestly variations and modifications in whole or in part may be resorted to, and parts may be used without others within wide limits and within the scope of the appended claim.

Having now fully described my invention, I claim:

In a tree stand having a base, a motor, a socket for supporting the shank of a tree, and means for transmitting rotation from the motor to said socket, the combination of an upright tubular support fixed upon said base having a bearing upon the lower portion thereof and a bearing flange upon an upper portion spaced a distance above said bearing, a rotatable tubular member supported by said bearing exteriorly of the tubular support and the bearing flange and terminating at the top in said socket, a plural conductor means extending upward through the tubular support and terminating in an insulated commutation block having two electrical contacts stationary within said rotatable tubular member below the level of said socket, and a detachable connector for bringing electric current to the tree above said socket from said commutation block, including a rotatable sleeve making sliding rotary contact with one of the contacts on said block, an insulate connector member having a metal portion fitting within said rotatable sleeve, an end contact making frictional contact with the other contact upon said block, a flexible conductor connected to the connector member, and a plug-in outlet upon said flexible conductor for receiving a plug-in member upon a conductor leading up to said tree.

ERNESTO ROCCO.

REFERENCES CITED

The following references are of record in the file of this patent:

UNITED STATES PATENTS

| Number | Name | Date |
|---|---|---|
| 1,943,659 | Eason | Jan. 16, 1934 |
| 1,971,300 | Garrett | Aug. 21, 1934 |
| 1,987,994 | Doring | Jan. 15, 1935 |
| 2,005,293 | Harris | June 18, 1935 |
| 2,058,677 | Fritz | Oct. 27, 1936 |
| 2,279,182 | Snyder | Apr. 7, 1942 |